(No Model.) 5 Sheets—Sheet 1.

D. HEPP.
ROD OR SLAT MACHINE.

No. 514,750. Patented Feb. 13, 1894.

WITNESSES:
F. L. Durand
W. L. Coombs

INVENTOR:
Daniel Hepp,
By Louis Bagger & Co.
Attorneys (No Model.) 5 Sheets—Sheet 3.

D. HEPP.
ROD OR SLAT MACHINE.

No. 514,750. Patented Feb. 13, 1894.

WITNESSES:
F. L. Ourand
H. L. Coombs

INVENTOR:
Daniel Hepp
By Louis Bagger & Co.
Attorneys.

(No Model.) 5 Sheets—Sheet 4.

D. HEPP.
ROD OR SLAT MACHINE.

No. 514,750. Patented Feb. 13, 1894.

WITNESSES: F. L. Ourand, W. L. Coombs

INVENTOR: Daniel Hepp, by Louis Jagger & Co., Attorneys (No Model.) 5 Sheets—Sheet 5.
D. HEPP.
ROD OR SLAT MACHINE.
No. 514,750. Patented Feb. 13, 1894.
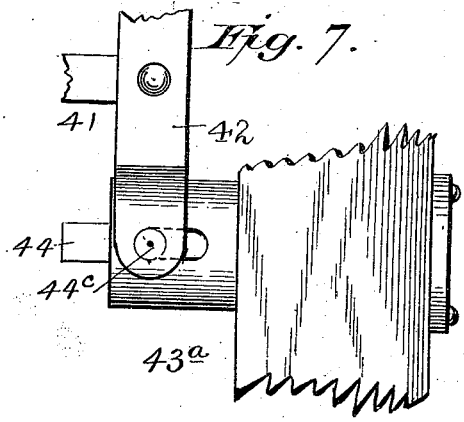
Fig. 7.
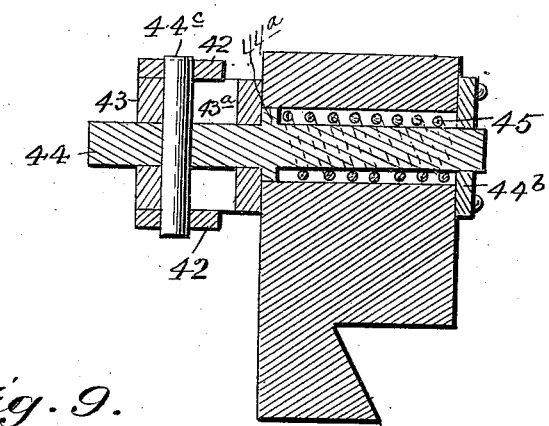
Fig. 8.
Fig. 9.
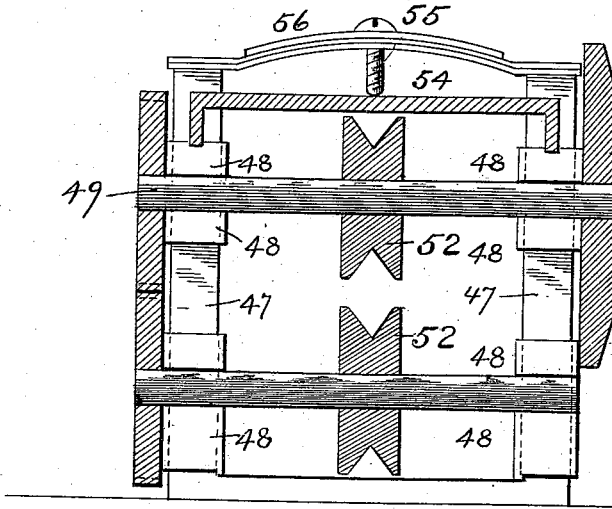
Fig. 11
Fig. 10.
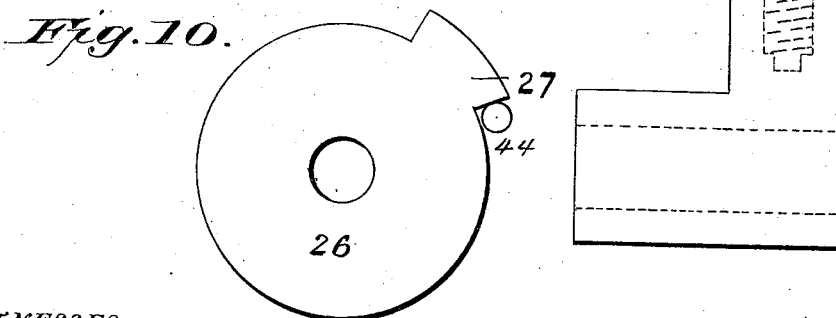
WITNESSES:
F. L. Ourand
H. L. Coombs
INVENTOR:
Daniel Hepp,
by Louis Bagger & Co.
Attorneys
THE NATIONAL LITHOGRAPHING COMPANY,
WASHINGTON, D. C.

UNITED STATES PATENT OFFICE.

DANIEL HEPP, OF CHICAGO, ILLINOIS.

ROD OR SLAT MACHINE.

SPECIFICATION forming part of Letters Patent No. 514,750, dated February 13, 1894.

Application filed June 30, 1892. Serial No. 438,631. (No model.)

*To all whom it may concern:*

Be it known that I, DANIEL HEPP, a citizen of the United States, and a resident of Chicago, in the county of Cook and State of Illinois, have invented certain new and useful Improvements in Rod or Slat Machines; and I do hereby declare that the following is a full, clear, and exact description of the invention, which will enable others skilled in the art to which it appertains to make and use the same, reference being had to the accompanying drawings, which form a part of this specification.

My invention relates to improvements in wood working machines of that description in which a round rod or rectangular slat is intermittently fed to a rotating cutter which also revolves around the material being operated, whereby ornamental peripheral grooves or beads are formed on a rod and curved or angular tenons formed in a slat, according to the contour of the said material fed to the cutters.

The object of the invention is to provide an improved construction of machine of the above character, by which I attain superior advantages with respect to simplicity and efficiency, and by which rods or slats of continuous or indefinite lengths may be operated upon.

The invention consists in the novel construction and combination of parts hereinafter fully described and claimed.

Figure 1:
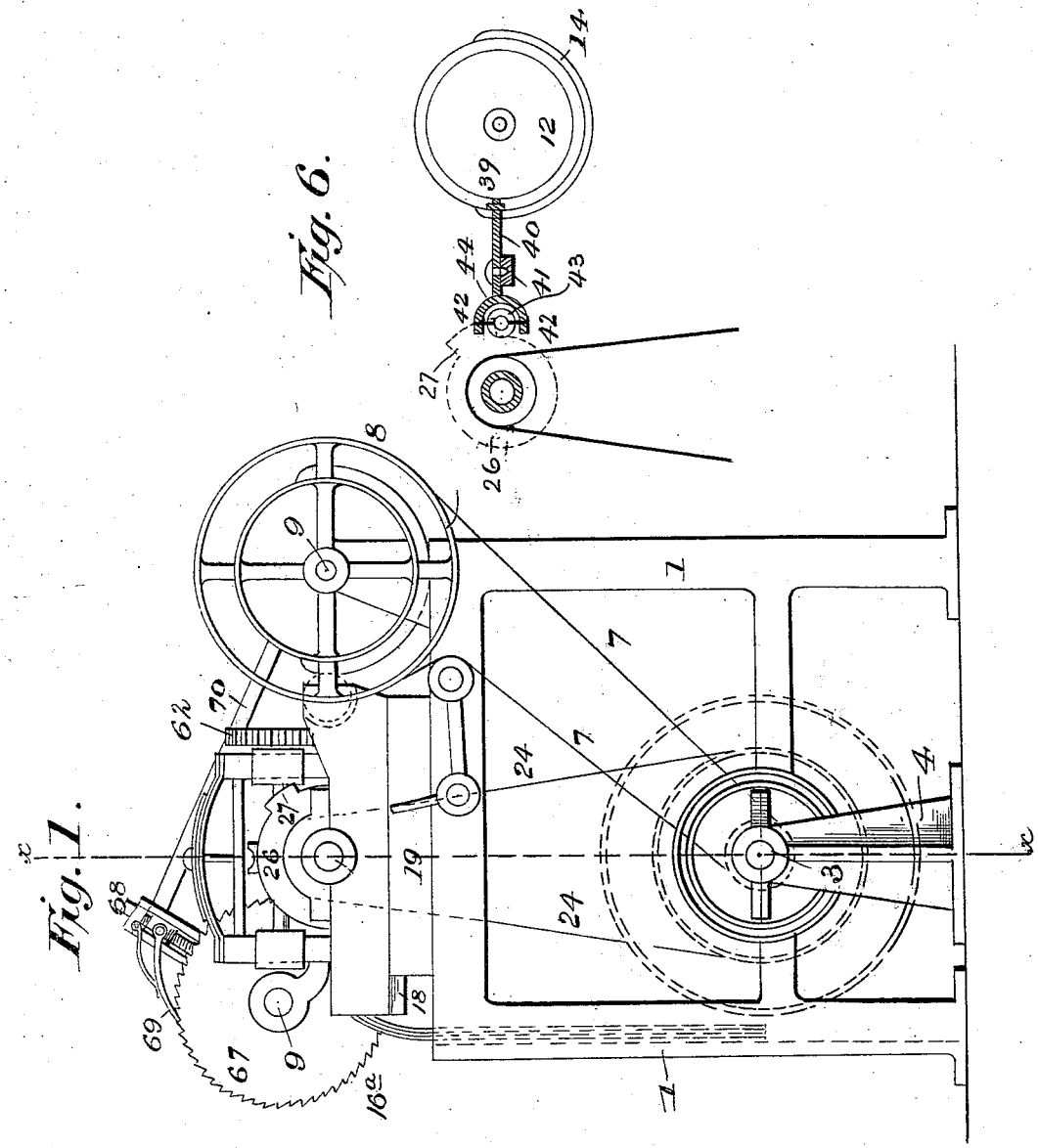
Figure 2:
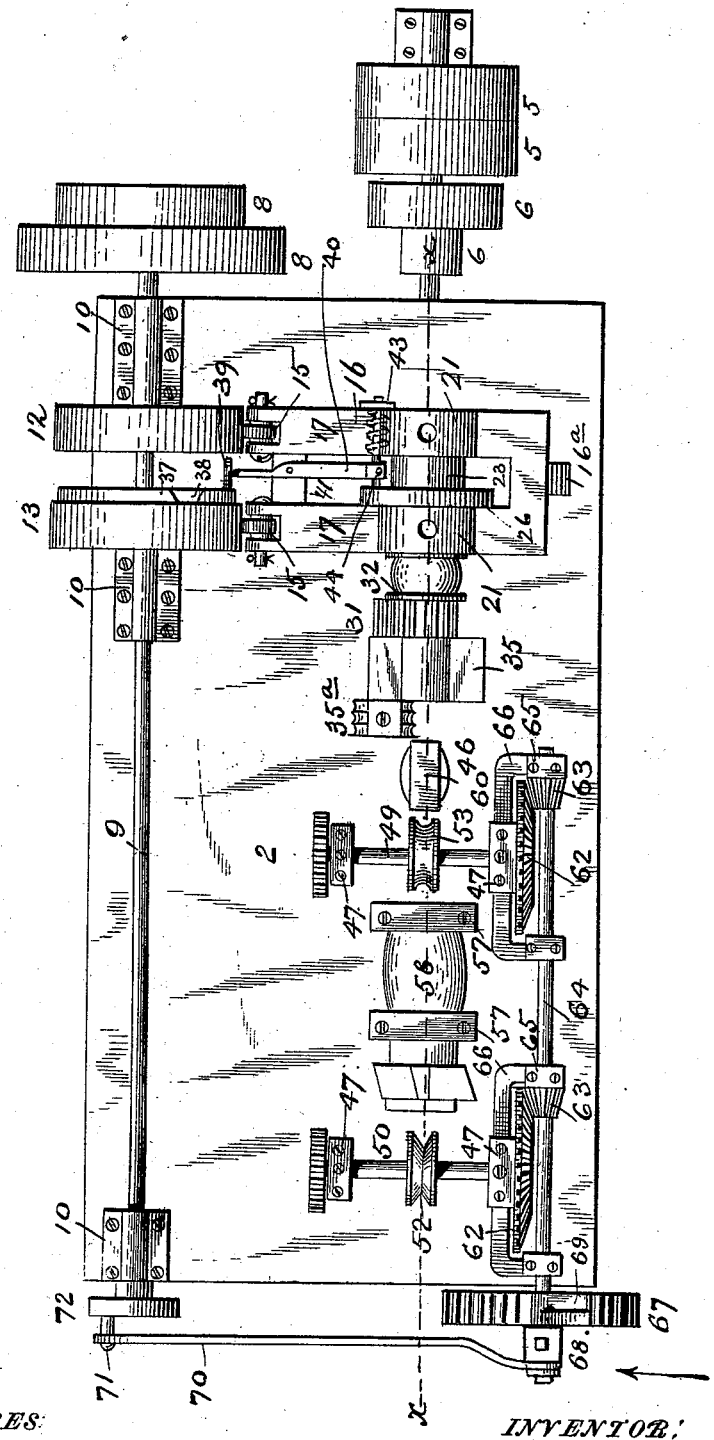
Figure 3:
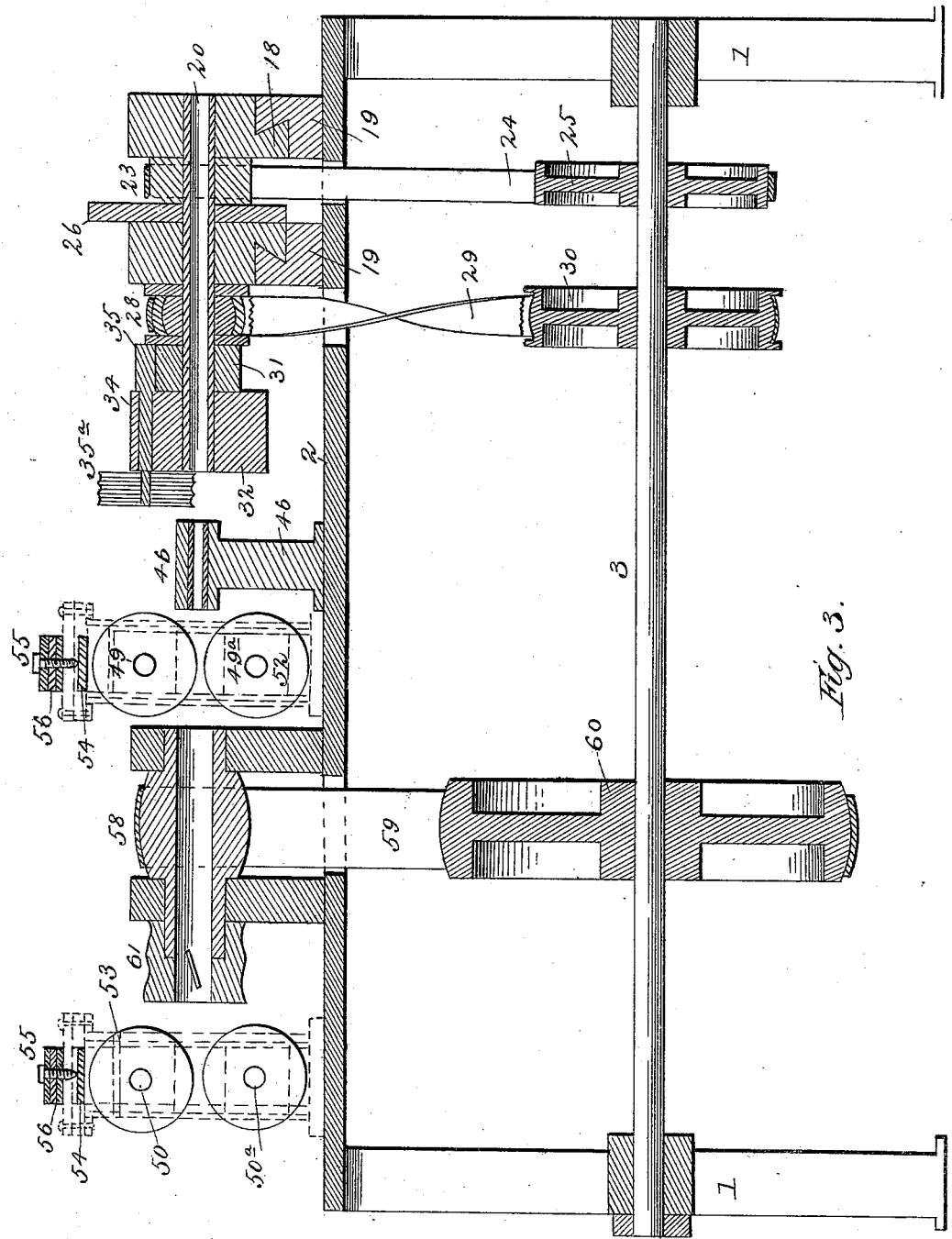
Figure 4:
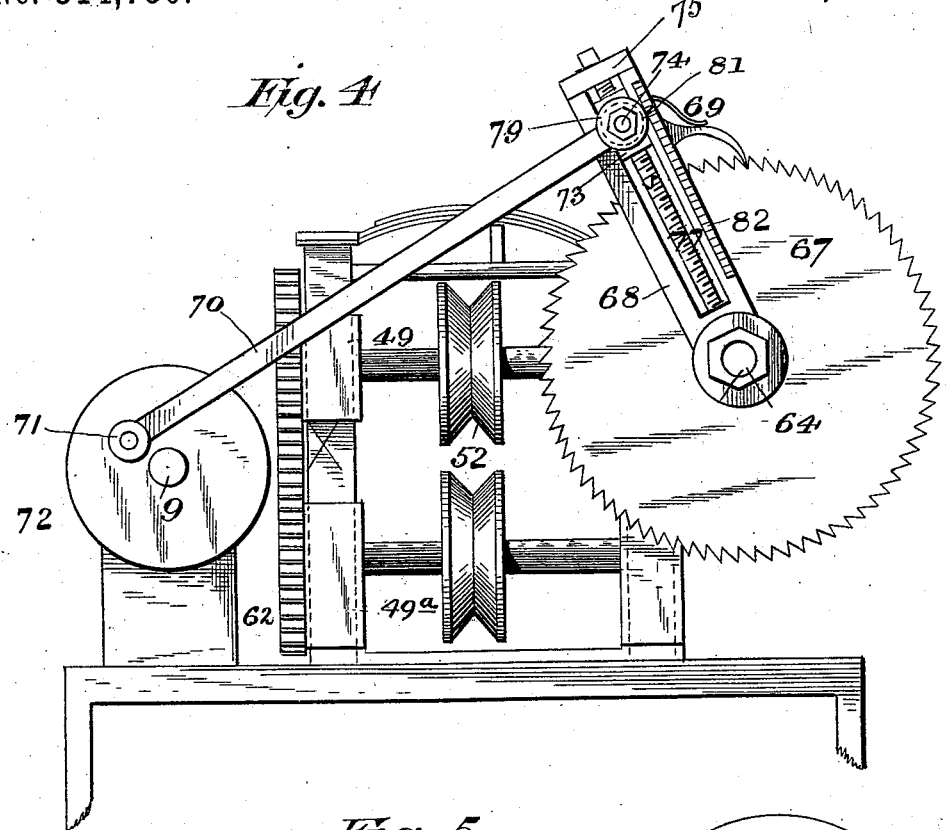
Figure 5:
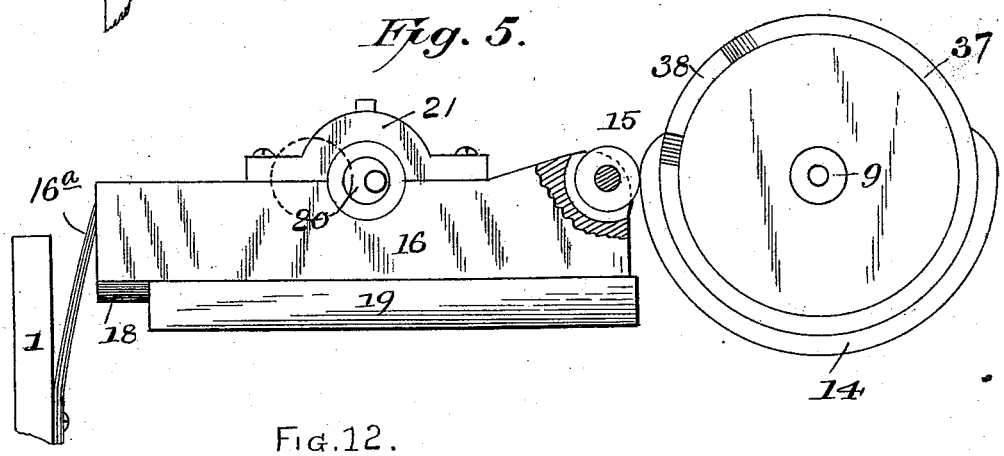
Figure 12:

In the accompanying drawings: Figure 1 is a side or end elevation of a machine constructed in accordance with my invention. Fig. 2 is a plan view of the same, the devices for holding the journal boxes for the shafts of the feed rolls being removed. Fig. 3 is a longitudinal sectional view on the line $x, x$, Figs. 1 and 2, looking in the direction of the arrows. Fig. 4 is an end view of the upper portion of the machine, looking from the opposite side of Fig. 1. Fig. 5 is a detail view of the sliding carriage and the cam wheel for operating the same. Fig. 6 is a detail view showing the lever and cam wheel and plate wheel for stopping the hollow shaft carrying the rotating and revolving cutters. Figs. 7, 8, 9 and 10 are detail views of various parts. Fig. 11 is a detail view of the lever carrying the vertically movable block. Fig. 12 is a view of a portion of a rod made by my said invention.

In the said drawings the reference numeral 1 denotes a series of uprights which are suitably braced and connected at their upper ends by a rectangular plate forming a base or support for the various working parts of the machine. This base is slotted wherever necessary for any of the parts carried thereby to project below the same.

The numeral 3 designates the main driving shaft journaled in uprights 4, at each end of the machine, and provided with pulleys 5, 5, at one end, which may be connected with any suitable motor. Also carried by this shaft are pulleys 6, 6, connected by a belt 7, with either of the two pulleys 8, 8, secured to the horizontal shaft 9, journaled in bearings 10, secured to and projecting above the base 2. This shaft 9 also carries two cam wheels 12 and 13, each having a portion of its diameter reduced forming peripheral extensions 14, which are adapted to bear against rollers 15, removably journaled in the ends of the sliding carriage 16. This carriage comprises two transverse arms 17 connected together at one end and formed on their under side with tenons 18, which work in ways formed in blocks 19 secured to the base. Carried by this carriage is a hollow shaft 20, journaled in bearings 21, and provided with a fast or fixed pulley 23, connected by belt 24 with a pulley 25, secured to shaft 3. This shaft also carries a plate wheel 26 secured to or forming part of pulley 23, having a projection 27, a loose pulley 28, connected by belt 29 with pulley 30 on shaft 3, a sun-gear 31, and a casting 32. The sun gear and pulley 28 are so connected together as to rotate in unison on the hollow shaft while the casting is fixed to said shaft and rotates therewith. The casting is formed with a horizontal aperture in which is journaled the spindle 34 of a planet gear 35 meshing with the sun gear. The opposite end of this spindle carries a rotating cutter $35^a$ of any desirable form or contour.

It will be noted that the bore of the shaft 20, is of greater diameter than the rod operated upon, which will allow of the slight reciprocating movement of the carriage.

The numeral $16^a$ denotes a spring connected with the uprights 1, with its free end bearing against the carriage 16 to move the same back after having been actuated by the cams. The function of the reciprocating carriage is to move the rotatable cutter 35ª to and from the work.

Secured to or forming part of one of the faces or sides of cam wheel 13 is a disk or annular hub 37, provided with a peripheral beveled recess 38, which is adapted to receive a roller contact 39, journaled upon one end of a lever 40, pivoted to a web 41, connecting the two arms of the carriage. The other end of this lever is bifurcated or formed with two curved arms 42 which partly embrace an annular block 43, having a slot 43ª. Passing through a central aperture in this block and also through a corresponding aperture somewhat larger in diameter in one of the arms of the sliding carriage is a horizontally slidable pin or rod 44 having a collar 44ª abutting against the block. One end of this pin is adapted to engage with the projection 27 of the plate wheel 26, while its other end passes through an aperture in a plate 44ᵇ secured to said carriage. Encircling said pin and located in the aperture in the carriage arm is a coiled spring 45, and passing through the slot in block 43, is a vertical pin 44ᶜ, the ends of which are connected with the bifurcated ends 42 of lever 40. The spring 45 is connected with said collar 44ª and plate 44ᵇ, the tendency of which is to draw or pull the pin 44 away from the face plate 27 so that the roller contacts carried by the opposite end of lever 40, will be forced into the recess 38, in the hub 37 when said recess registers therewith.

Secured to the base 2, just in front of the cutter 35ª, is a bracket 46, having an aperture aligned with the hollow shaft and provided with a bushing through which the rod to be operated on passes. This bushing is removable so that it can be replaced by others of varying sizes so as to correspond with rods of different diameters.

The numerals 47, 47, denote standards carrying boxes 48 in which are journaled shafts 49 49ª and 50, 50ª to which are secured the feed rollers 52 and 53. The front feed rollers 52, or those which first receive the rod or slat, are formed with angular peripheral grooves, while the others 53, have curved grooves. The upper boxes in which the shafts 49 and 50 are journaled are held in place by the plate 54 and set screw 55 passing through a threaded aperture in a plate 56 secured to the brackets. Intermediate of these feed rollers and journaled in brackets 57, secured to base 2, is a hollow pulley 58 connected by a belt 59, with a pulley 60 on the main driving shaft. With this pulley is connected a hollow cutter head 61.

The shafts 49 and 50 are provided with bevel gears 62 which mesh with bevel pinions 63, upon a shaft 64 journaled in the boxes or bearings 65, carried by the arms 66, secured to the standards 47. To the outer or front end the shaft is provided with a ratchet wheel 67 keyed or otherwise secured thereon, and with a lever 68 pivoted thereto. This lever at its upper end is provided with a spring pawl 69 adapted to engage with the ratchet teeth of said wheel, and is connected by means of a pitman 70, with a crank wrist pin 71, on a disk 72, secured to the front end of shaft 9. The pitman is adjustably connected with lever 68, so as to vary the swing thereof and cause a more or less feed of the rod in the following manner: The lever consists of a hollow rectangular bar in which is located a vertically movable block 73, having a screw-threaded aperture, through which passes a screw-rod 74, journaled in the lower end of said lever and in a plate 75, secured to the upper end thereof. The upper end of this screw-rod is squared so that it can be rotated by means of a wrench or other tool to vertically move said block. The block is provided with a stud 76 projecting through a slot 77 in the lever and is provided with a washer 78, a flanged collar 79 on which the pitman 70 is journaled and a securing nut 80. The washer is provided with a pointer 81, and the lever with a gage 82, to indicate the adjustment of the lever.

The operation is as follows: The driving-shaft 3 is actuated from any suitable source of power, which shaft through the medium of pulleys 30 and 60, rotates the sun and planet gears, and through the medium of pulleys 6 and 8 rotates shaft 9, the cam-wheels 12 and 13, and the disk 72, the movements of which are continuous as long as shaft 3 is operated. This disk 72, through its crank 71 and pitman 70, oscillates lever 68, causing the pawl carried thereby to ride over the ratchets of wheel 67, during one-half of the revolution of said disk, without engagement therewith, but during the remainder of the revolution the pawl will engage with said teeth causing said wheel and its shaft 64, to be partially rotated and the bevel pinions 63 and gears 62 and their shafts 49 49ª and 50, 50ª carrying the feed-wheels 52 and 53 to be correspondingly actuated. If an angular rod or bar be now inserted between feed-wheels 53, it will be intermittently fed to and through the hollow head 61, the cutters of which will fashion it into a round bar or rod. The rod will now pass to the feed-rollers or wheels 52, and from thence to and through bracket 46, to the hollow shaft 20, which is of larger diameter than the said rod. These movements must be so timed that just as the rod reaches shaft 20, the feed must stop and the rod be held stationary until the rotating cutter 35ª makes a complete revolution around the rod. Just about the time the feed of the rod stops, the rollers 15, of the carriage 16, are traveling off of the cams 14 of the wheels 12 and 13, see Fig. 5. When the said rollers have traveled off the cams, the spring 16ª, will force the carriage toward the cam-wheels, bringing the rod to the center of the hollow shaft 20. By the time this is accomplished the roller 39, will fall into the notch or recess 38, of the hub 37, causing the spring 45, to force the pin 44, out of engagement with the projection 27, of the wheel 26, and allowing the latter to be rotated through the medium of pulley 25, and its belt, which in turn rotates the shaft 20, and casting 32, and revolves the cutter around the rod. During this revolution of the cutter it is rotated by means of the planet and sun-gear and pulley 28, as before stated. By the time the cutter has made a complete revolution around the rod, the lever 40 will have been disengaged from the recess 38, of the hub 37, so that its other end will be forced toward the plate-wheel and the pin 44, to lie in the path of the projection 27, which latter engaging therewith stops the rotation of said plate and pulley 23, the belt of this pulley being loose enough to slide thereon. At the same time the above movements are taking place the pawl 69 of lever 68, will ride over the ratchets on wheel 67, so that the rod will not be fed forward, but by the time the cutter has completed its revolution the said lever will be operated in a reverse direction through the medium of the pitman and connections when the pawl will engage with the ratchet-wheel and again feed the rod forward as first described, when the operation will be repeated.

From the above it will be seen that the shaft 3, pulleys 25, 30 and 60, shaft 9, cam wheels 12 and 13, disk 72, cutter 35$^a$, its spindle 34, planet gear 35, sun gear 31, pulley 28, and the rotary cutter head 61, and its pulley 58, rotate continuously, while pulley 23, hollow shaft 20, the feed rollers and ratchet wheel 67, rotate intermittently. The carriage also moves intermittently back and forth. The parts are so timed relatively to each other, that while the pawls on the lever connected with the pitman 70, are moving the ratchet wheel to rotate the feed rollers and feed the rod forward, the carriage (with the sun and planet gears, the cutter, the casting 32, and the pulley 23), is pushed outward by the cams 12 and 13, and the pin 44, engaged with the projection 27, on wheel 26, so that the latter and the shaft 20 and casting 32 will remain stationary. By the time the rod has been fed forward a sufficient distance, the pitman 70 will commence its return movement and the rotation of the ratchet wheel will cease and the rod remain stationary. By this time the rollers 15 of the carriage will travel off of the cams 14, when the spring will force said carriage inward, and the pin 44 be disengaged from projection 27, causing pulley 23, shaft 20, and casting 32, to be rotated and the rotary cutter to revolve around and act upon the rod. By the time said cutter has made a complete revolution around the rod, the cams will force said carriage outward throwing the pin 44, into the path of projection 27, and stopping the rotation of shaft 20. The ratchet wheel will now be again actuated to feed the rod forward.

As shown in Fig. 5, the parts are in the position they occupy after the work has been turned into cylindrical form and fed forward to be operated upon. The rollers of the carriage are now just ready to run off of the extensions of the cam wheels. The ends of these extensions are curved or beveled, and as said rollers travel thereon the carriage will be forced laterally toward the cam wheel, and bringing the work toward the center of the hollow shaft. Just before the rollers travel off said curved or beveled ends the work will come in contact with the rotating cutter which will take or cut into the periphery to the proper depth to form the molding. At the moment the rollers travel off the said curved ends onto the reduced portions of the cam wheels, the work will be exactly in the center of the hollow tube with the rotating cutter taking into the periphery thereof. The rotating cutter will now be revolved around the work through the medium of the casting 32, and connections before described, and as the center of the orbit of said cutter is the axis of the work, it is manifest that the cutter in its revolution will uniformly trim the circumference of the work.

The purpose of the reciprocation of the carriage comprising arms 17, and carrying casting 32, tube 20, and cutter 35$^a$, is to permit the feed of material into tube 20, without striking the face of the cutter 35$^a$, which projects in beyond the edge of tube 20, on one side and which would obstruct the passage of the work, if the latter were fed centrally through the tube 20. When feed of the work is stopped the carriage is brought into position with the tube concentric with the work so that the edge of the cutter engages the same and remains in engagement therewith during the complete rotation of the cutter thereabout.

Having thus described my invention, what I claim is—

1. In a machine for cutting moldings or tenons in rods or slats, the combination of the intermittently reciprocating carriage, the intermittently rotating hollow shaft and casting, and the continuously rotating planet cutter carried by and journaled in said casting, substantially as described.

2. In a machine for cutting moldings or tenons in rods or slats, the combination with the intermittently reciprocating carriage, the intermittently rotating hollow shaft and casting, and the continuously rotating planet cutter, carried by and journaled in said casting, of means for intermittently feeding rods or slats to said planet cutter, substantially as described.

3. In a machine for cutting moldings or tenons in rods or slats, the combination with the uprights and base, the driving shaft, the shaft connected therewith, and the cam wheels on said shaft, of the sliding carriage having removable rollers journaled in one end, a hollow shaft journaled in said carriage, the casting carried by said shaft, the planet cutter and its pinion, the sun gear and means for operating said shafts, substantially as described.

4. In a machine for cutting moldings or tenons on rods or slats, the combination with the uprights and base, the driving shaft and the shaft connected therewith provided with cam wheels, of the reciprocating carriage, the spring secured to said uprights and bearing against the end thereof, the hollow shaft carried thereby provided with a casting, the planet cutter having a spindle journaled in said casting, the pinion, the sun gear and means for operating said shafts, substantially as described.

5. In a machine for cutting moldings or tenons in rods or slats, the combination with the uprights and base, the driving shaft, the shaft connected therewith, provided with cam wheels, and the hub or disk formed or connected with one of said wheels, having a peripheral recess, of the intermittently rotating carriage, the lever pivoted thereto, having a contact adapted to engage with said recess, the hollow shaft at one end and a pin and spring at the other end, the face plate having a projection adapted to engage with said pin, a pulley secured to said face plate and fixed to the hollow shaft, the casting secured to said shaft, the planet cutter having a spindle journaled in said casting and provided with a pinion, the sun gear and pulley loosely mounted on said shaft, and means for rotating said pulleys, substantially as described.

6. In a machine for cutting moldings upon rods, the combination with the shaft having a disk provided with a crank or wrist pin and the pitman connected therewith, of the hollow cutter head, the feed rollers, the bevel gears and pinions, the shaft carrying said pinions provided with a ratchet wheel at its outer end, the hollow lever journaled on said shaft, the screw rod journaled in said lever, the screw threaded block with which said lever engages and with which the pitman is connected and the spring pawl pivoted to said lever, substantially as described.

In testimony that I claim the foregoing as my own I have hereunto affixed my signature in presence of two witnesses.

DANIEL HEPP.

Witnesses:
I. F. DANKOWSKI,
FRED HACKER.